March 8, 1966    F. D. WERNER ETAL    3,239,827
HIGH PRECISION PRESSURE STANDARD
Filed Jan. 12, 1960    5 Sheets-Sheet 1
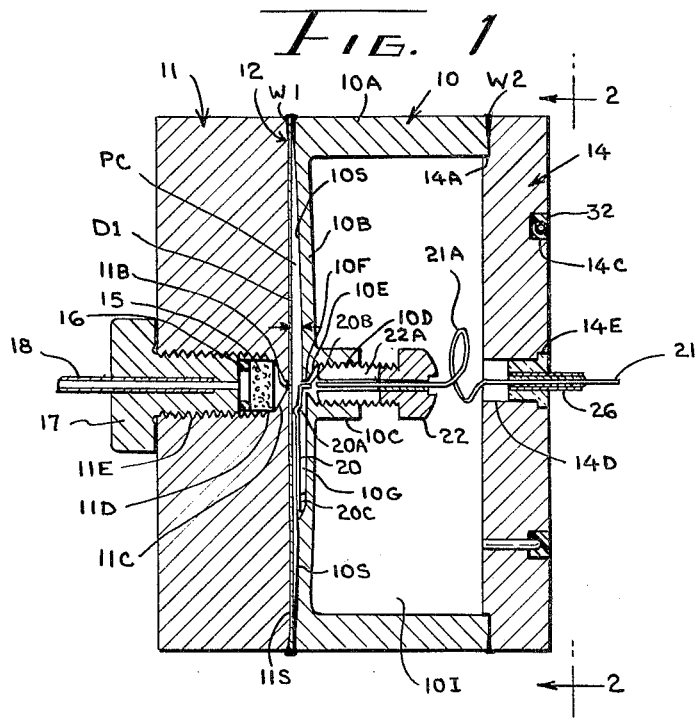
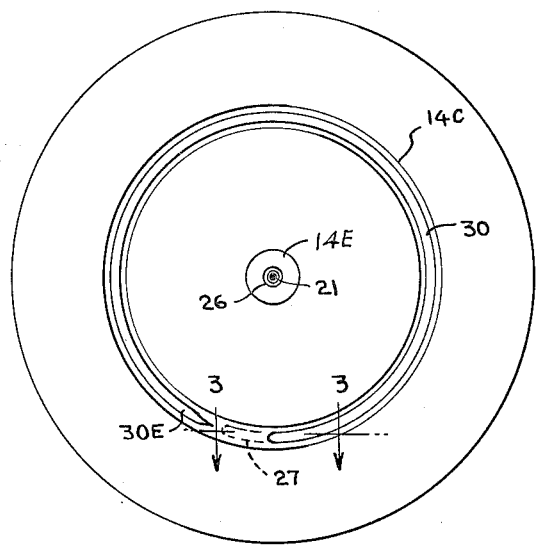
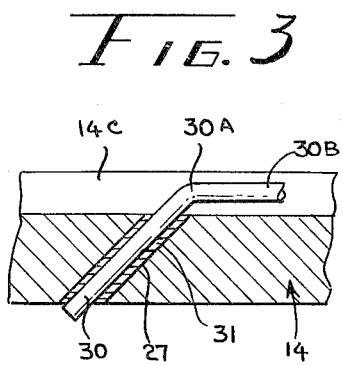
INVENTORS
FRANK D. WERNER
ROBERT R. KOOIMAN
RICHARD L. ENGLUND
BY Dugger & Johnson
ATTORNEYS

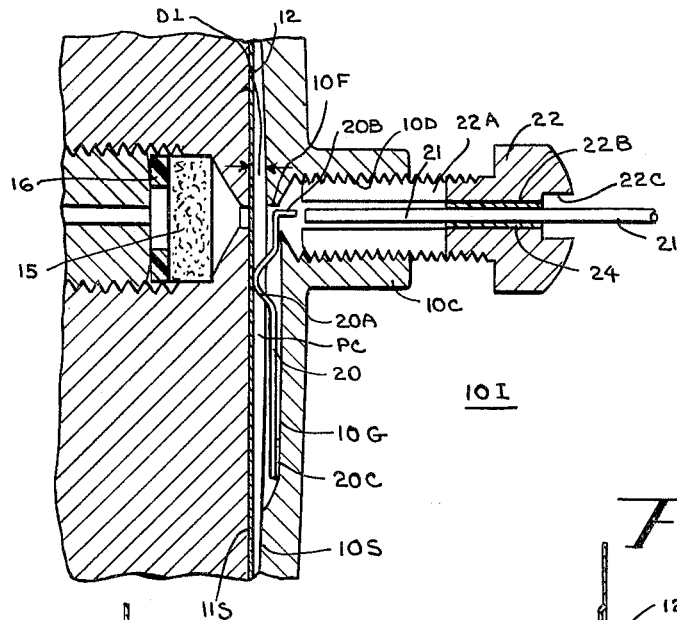
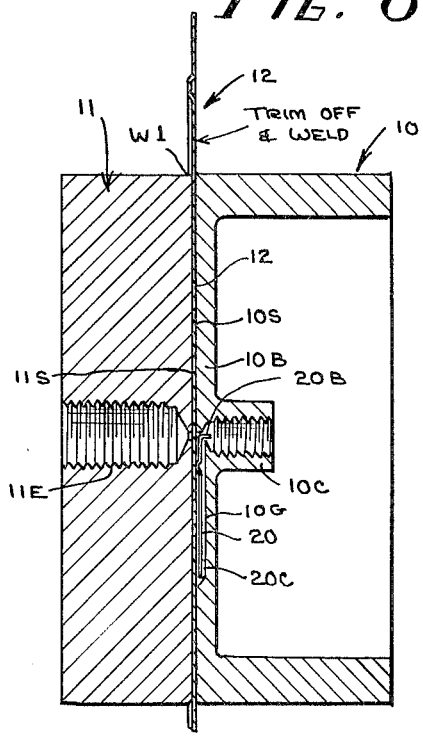
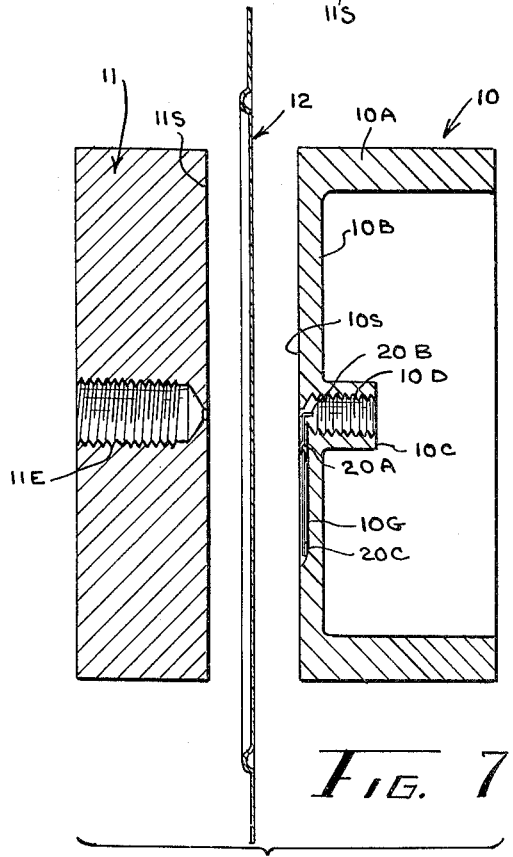

March 8, 1966     F. D. WERNER ETAL     3,239,827
HIGH PRECISION PRESSURE STANDARD
Filed Jan. 12, 1960     5 Sheets-Sheet 3
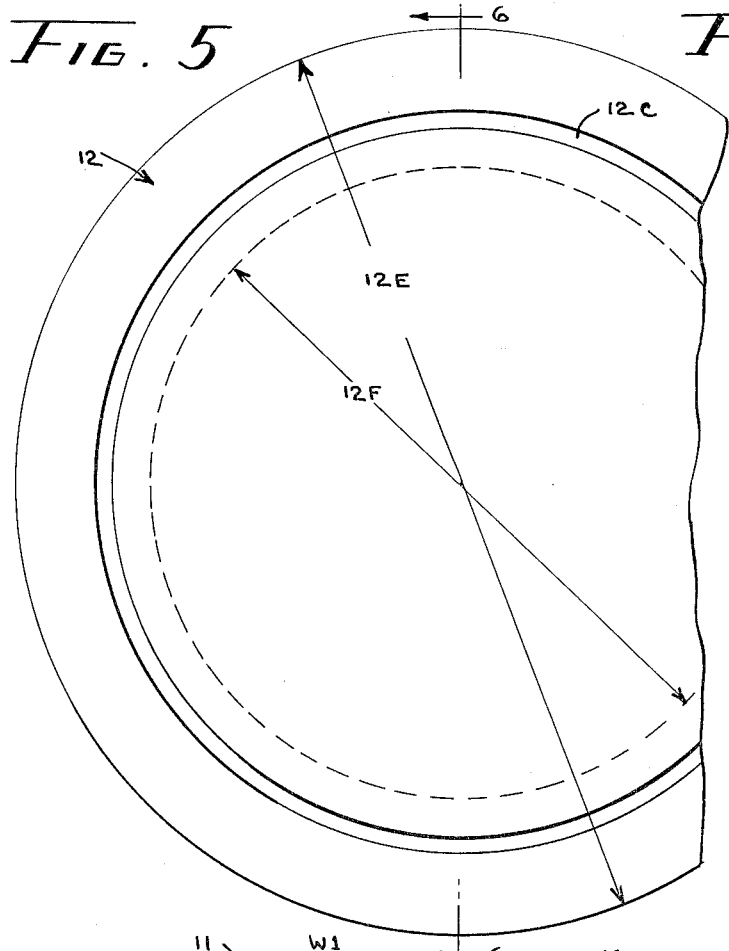
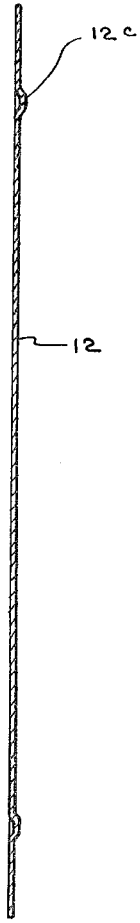
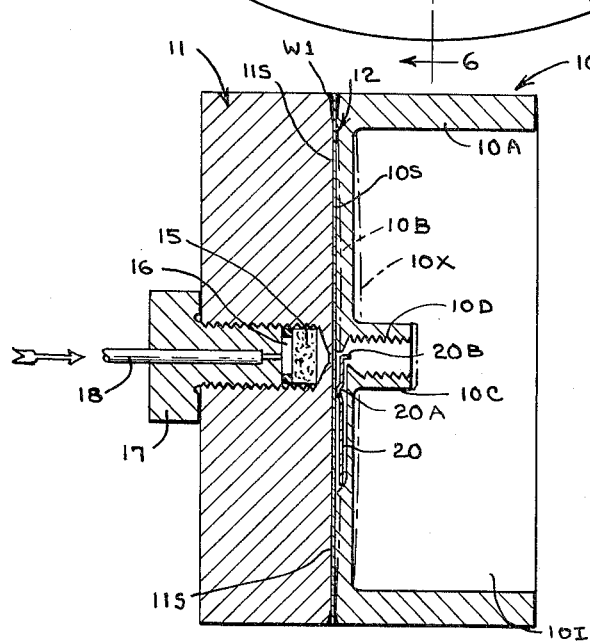
INVENTORS
FRANK D. WERNER
ROBERT R. KOOIMAN
RICHARD L. ENGLUND
BY Klugger & Johnson
ATTORNEYS March 8, 1966 F. D. WERNER ETAL 3,239,827
HIGH PRECISION PRESSURE STANDARD
Filed Jan. 12, 1960 5 Sheets-Sheet 4

INVENTORS
FRANK D. WERNER
ROBERT R. KOOIMAN
RICHARD L. ENGLUND
BY Wuegger & Johnson
ATTORNEYS March 8, 1966  F. D. WERNER ETAL  3,239,827
HIGH PRECISION PRESSURE STANDARD
Filed Jan. 12, 1960  5 Sheets-Sheet 5
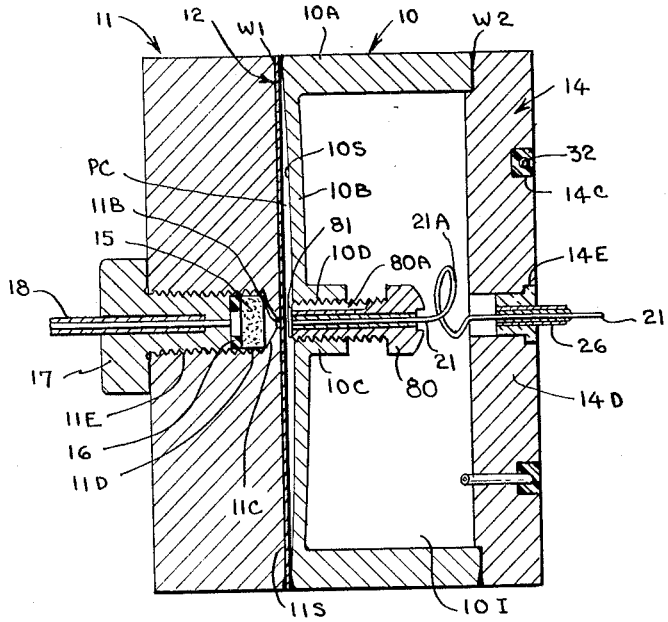
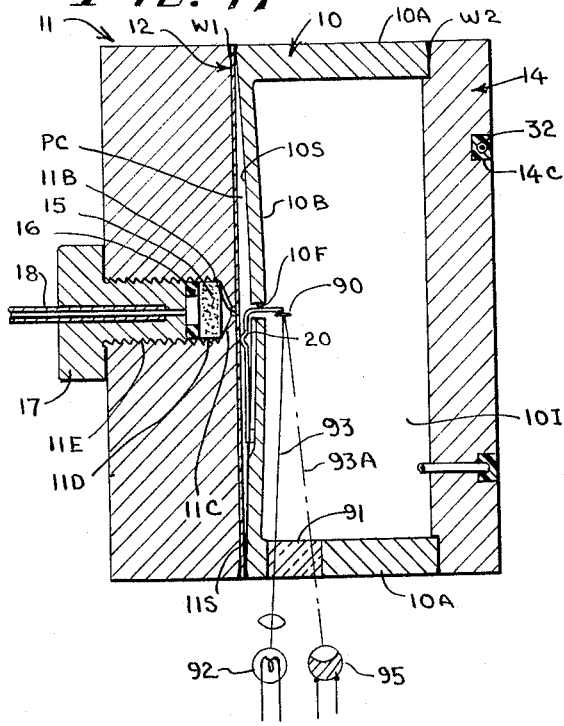
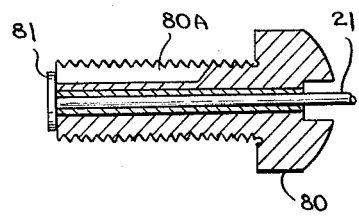
*INVENTORS*
FRANK D. WERNER
ROBERT R. KOOIMAN
RICHARD L. ENGLUND
BY Dugger & Johnson
*ATTORNEYS*

United States Patent Office 3,239,827
Patented Mar. 8, 1966

3,239,827
HIGH PRECISION PRESSURE STANDARD
Frank D. Werner, Bloomington, Minneapolis, Robert R. Kooiman, Fridley, Minneapolis, and Richard L. Englund, Richfield, Minneapolis, Minn., assignors to Rosemount Engineering Company, Minneapolis, Minn., a corporation of Minnesota
Filed Jan. 12, 1960, Ser. No. 1,975
16 Claims. (Cl. 340—236)

This invention relates to pressure standard devices, and systems, and particularly to readily usable pressure standards which may be used in industry for the calibration of industrial pressure indicating and responsive products.

Heretofore, devices available for calibration of pressure indicating and responsive equipment have been in the form of mercurial manometers, dead weight type instruments or highly accurate gauges which have been calibrated against accepted standards. The underlying standards for pressure are determined by large and expensive apparatus but such apparatus, of which the foremost is available at the United States Bureau of Standards, is not portable and is not of the kind which can be readily used in industry. Accordingly, insofar as industrial products are concerned, it has been the practice to utilize the simpler types of manometers, dead weight type instruments and/or calibrated pressure gauges. This practice, although satisfactory in some instances, is almost universally wanting in simplicity, ease, and speed of measurement and accuracy.

It is an object of this invention to provide pressure standards which are capable of maintaining their calibration and which may be used as "check points" for locally calibrating good and sensitive gauges or used per se, as pressure responsive devices. It is another object of the invention to provide a pressure standard system which, once calibrated, will maintain calibration over an indefinite period and may be shipped under conditions of rugged transport, and used remote from the place of original calibration with assurance that calibration has not changed. It is a further object of the invention to provide a pressure standard which will maintain pressure calibration over long periods.

It is another object of the invention to provide improved methods of making pressure standards and sub-assemblies thereof.

Other and further objects are those inherent in the invention herein illustrated, described, and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention is illustrated with reference to the drawings wherein:

FIGURE 1 is a longitudinal sectional view through an exemplary form of pressure standard of the present invention;

FIGURE 2 is an end view taken in the direction of arrows 2—2 of FIGURE 1 of the device shown in FIGURE 1;

FIGURE 3 is an enlarged fragmentary sectional view taken along the line and in the direction of arrows 3—3 of FIGURE 2;

FIGURE 4 is a much enlarged fragmentary longitudinal sectional view of the central portion of the illustration in FIGURE 1 showing particularly the electric contact device;

FIGURE 5 is a plan view of (a portion of) the diaphragm used in the exemplary form of apparatus shown in FIGURE 1;

FIGURE 6 is a sectional view along the lines and in the direction of arrows 6—6 of FIGURE 5;

FIGURE 7 is an exploded longitudinal sectional view illustrating several parts of a sub-assembly of FIGURE 1 prior to assembly of the device shown in FIGURE 1;

FIGURE 8 is a longitudinal sectional view of the sub-assembly of FIGURE 7 and shows the same parts as illustrated in FIGURE 7, but in further assembled relationship;

FIGURE 9 is a longitudinal sectional view, further illustration of the same device as shown in FIGURES 7 and 8 and at a subsequent step in the process of manufacture; the device shown in FIGURE 1 corresponds to the device shown in FIGURE 9, but at an earlier stage in the manufacture thereof;

FIGURE 11 being a longitudinal sectional view therethrough and FIGURE 12 a transverse sectional view taken along the line and in the direction of arrows 12—12 of FIGURE 11;

FIGURE 13 and FIGURE 13A show a slightly modified form of the invention. FIGURE 13 is a longitudinal sectional view and FIGURE 13A is a separated view of one part removed, and in section, FIGURE 14 shows another slightly modified form of the invention and is a longitudinal sectional view.

Throughout the drawings the corresponding numerals refer to the same parts.

Figure 10:
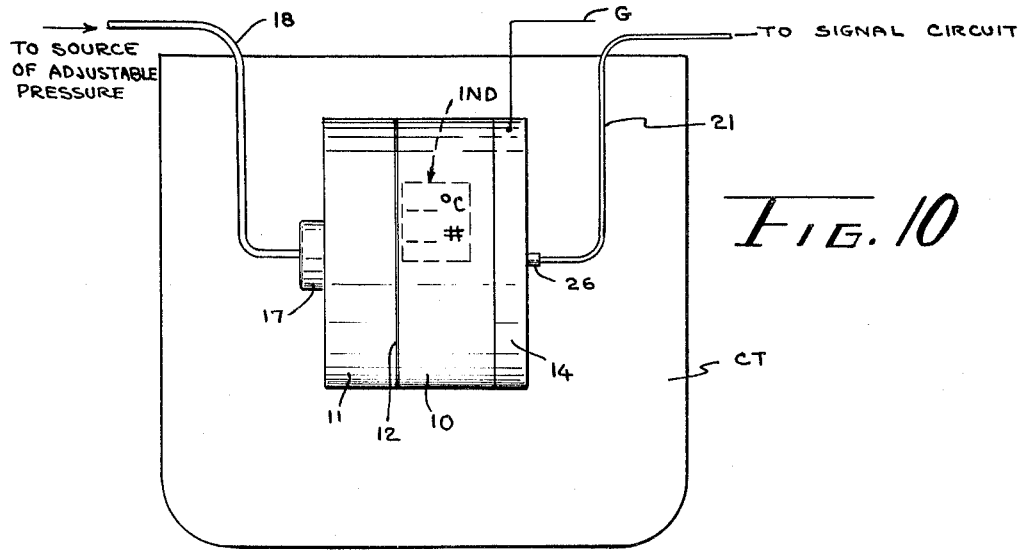
FIGURE 10 is a schematic illustration of a pressure calibrating system of the invention utilizing the device shown in FIGURE 1.

Referring to FIGURES 1–9, the pressure standard comprises one closure member in the form of a cup generally designated 10, a second closure member in the form of a heavy disc generally designated 11, and a diaphragm generally designated 12. The diaphragm is positioned between and hermetically sealed with respect to the cup and the disc. The cup also includes a cup cover generally designated 14. The cup 10 has thick sidewalls 10A and a somewhat thinner bottom 10B. When the cup is originally made, the bottom 10B has a planar bottom surface 10S as shown in FIGURES 7 and 9. As compared with the bottom 10B, the disc 11 is very thick, and its surface 11S which faces the diaphragm 12 is also planar.

The disc 11 is provided with a central drilled hole terminating as an aperture 11B in face 11S. This aperture is connected by the tapered bottom 11C of the drill hole. The drill hole is threaded throughout the portion of 11E of its depth but there is a small unthreaded portion at 11D. A filter 15 is positioned in this bottom portion 11D. This filter can be of any suitable material, such as sintered metal, ceramic, etc. It is held in place by a gasket 16 which is in turn held in place by the flat end of cap screw 17. The cap screw is drilled to receive a pressure connection pipe 18 that is sweated in place in the cap screw. The pipe 18 is a pressure connection to the source of unknown pressure, and this pressure connection is continued through the cap screw 17 so that pressure is delivered against the filter 15, and thence through the filter and through the tapered portion 11C and thence through the aperture 11B against the diaphragm 12.

The bottom 10B of the cup 10 is provided with a central boss 10C which is likewise threaded at 10D and provided with a conical bottom 10E which leads to an aperture 10F. On that face of the bottom 10B which is against the diaphragm 12, there is a groove 10G which extends radially inwardly and intersects the drill hole 10F. In this groove 10G there is positioned a contact-lever arm, 20, which is mounted on a block 20C. The block 20C and the adjacent end of the lever 20 are spot-welded together and are spot-welded to the bottom of the groove 10G in which they are situated. For low temperatures these parts may be soldered together rather than welded. The lever 20 has a kink in it at 20A (which bears against the diaphragm and is actuated thereby) and the lever 20 continues beyond the kink and is bent at right angles at 20B. The end 20B extends away from the diaphragm 12 and it is the flat end surface of this bent end 20B which constitutes the contact. The lever 20 is lightly resilient and is biased toward the diaphragm. Lever 20 is the movable contact that is actuated by the diaphragm. It is preferable that the entire lever 20 be made of gold, platinum, or tungsten wire and it is of smaller diameter than the cooperating contact 21 which is mounted in the screw 22.

The screw 22 is threaded to a diameter which would fit rather tightly in the threaded portion 10D were it not for the fact that it has a slotted end afforded by the slot 22A in the threaded portion of the screw. This slot permits at least the lower portion of the screw to be divided into two portions which are resilient in respect to each other and therefore the screw 22 resiliently fits into the threaded portion 10D of the boss 10C and therefore it may be readily turned, but will keep its adjustment. The screw 22 also has an axial drill hole at 22B which reaches from the screw driver slot 22C through the head of the screw and into the slot 22A. Centrally positioned within this drill hole is a ceramic insulator 24 which supports the contact wire 21. The contact wire is also preferably of the same metal as contact 20 and is larger in diameter than the contact end 20B of the contact lever 20. The result is that the flat end surface of 20B of the lever contact cooperates as a contact with the flat end of the wire contact 21 against which it works. The slot 22A in the screw 22 also serves as a passage through which gas may pass from the interior 10I of the cup 10 through the screw slot 22A and thence through the port 10F and thence against the adjacent face of the diaphragm 12.

The cup 10 is provided with a cover 14 which has a shoulder at 14A for purposes of positioning it. The cover 14 is provided with a concentric circular groove 14C and with a central aperature 14D in which a ceramic insulator 14E is adapted to be placed within the device is assembled. The ceramic insulator has a hermetically sealed tube 26 through which the outer end of the wire 21 is adapted to extend. It will be noticed in FIGURE 1 that the wire 21 is provided with a loop at 21A which allows some resiliency. The groove 14C at one place is provided with an angularly extending passage (drill hole) 27, as shown in FIGURES 1, 2, and 3, through which a tube 30 extends, the tube being bent at 30A so that its portion 30B lies in the groove 14C. The tube 30 is soldered at 31 into this drill hole so as to make a hermetic seal with the cover 14. The end 30E of the tube 30 is sealed in the finished device. The tube 30 is of a material which can be bent readily and deformed and its purpose is to permit a slight change in volume (for calibration purposes) of the sealed space 10I of the instrument. It is only necessary to pinch the tube 30 so as to reduce the total effective volume of the space 10I. Once calibrated the tube 30 is arranged in the groove 14 and a suitable filling 32 is poured in the groove so as to cover the tube and protect it against further deformation.

During the assembly of the pressure standard instrument, the diaphragm 12 is initially made as a large diameter blank having a diameter 12E which is larger than the diameter 12F of the diaphargm when assembled with the cup 10 and bottom plate 11, as shown in FIGURE 1. The diaphragm blank (diameter 12E) is then pre-stressed radially and for this it is placed in a punch press and is provided with one or more corrugations 12C, see FIGURES 5 and 6. By providing corrugation 12C, the diaphragm will be stressed radially throughout that portion of the diaphragm which is within the circle formed by the corrugation 12C. The diaphragm is then ready to assemble.

Prior to assembly, the cup 10, which is flat on the surface 10S, is provided with the groove 10G and the lever-contact 20 and block 20C all of which are positioned and welded or soldered in place as shown in FIGURES 4, 7, and 8. The cup 10, diaphragm 12, and plate 11 are then co-axially arranged as shown in FIGURE 7, and then brought into position with the bottom 10S of the cup in contact with one face of the diaphragm 12 and the surface 11S of the plate in contact with the other face of the diaphragm 12 as shown in FIGURE 8. The parts, then in the position shown in FIGURE 8, are temporarily clamped together by clamp means not shown which pushes the cup 10 and plate 11 together and this tightly holds the diaphragm 12. That part of the diaphragm 12 which is beyond the diameter of the cup 10 and plate 11 is then trimmed off. Then the three parts are welded together along the edge of the diaphragm at the welding circle W1, as shown in FIGURES 8 and 9. The weld serves not only to unite the cup 10, the plate 11, and the diaphragm 12, but it has been discovered that there is also a hermetic seal between all elements. It is preferable to construct these elements all of stainless steel, although other materials and metals may be used if so desired. The weld at W1 works exceptionally well for stainless steel and similar materials.

The device is then partially assembled as the subassembly shown in FIGURE 9 (less stud 17 and filter) and at this time, the bottom 10B of the cup is perfectly flat and in place against the diaphragm 12. The stud 17 and filter 15 are then coupled up and pressure is applied via the pipe 18. The pressure against the diaphragm 12 penetrates into the space between the diaphragm 12 and the flat surface of the plate 11 out to the weld W1. The plate 11 is very thick and does not appreciably deflect, at least not beyond its yield point, but if sufficient pressure is applied the bottom 10B of cup 10 can be sufficiently deflected so that it is bent or deformed into the shape of a shallow dish which is shown in exaggerated form, by the dot-dash lines 10X of FIGURE 9. In FIGURES 1, 4, and 9, the amount of deformation of the bottom 10B is much exaggerated as compared to the actual device, such exaggeration being essential for purposes of illustration. In an actual device the amount of deformation which is represented by the dimension between the bottom 10B and the adjacent planar surface of the diaphragm 12, need be no more than a few thousandths of an inch, this dimension being illustrated in FIGURES 1 and 4 as dimension D1.

After pressure is thus applied for deforming the bottom 10B, the pressure is removed and the bottom 10B then stays in a deformed condition as shown in dot-dash lines in FIGURE 9, and as shown in FIGURES 1 and 4. To this point, the cover 14 has not been placed, and the next step is then to place the screw 22 which is already preliminarily assembled with the contact wire 21 heat sealed into the insulator 24. The screw 22 is then brought down to a position, which by prior experience is known to be at the approximate position of calibration, and the protruding end of the wire 21 is extended out through the tube 21. With the cover in place, it is then welded to cup wall 10A at the weld W2.

If desired, the insulator 14E may be left out until after the cover 14 is welded onto cup 10. At this stage, the wire 21 can merely be brought out through the hole 14D and this will still allow at least the space of the hole 14D for manipulation of the screw 22 by a proper tool. The screw 22 is then turned down until contact wire 21 engages contact 20B and screw 22 is then backed off a specified amount. The insulator 14E can be hermetically sealed and fastened in place with appropriate materials after adjustment of screw 22 is made. Where the insulator 14E is already in place, or after it has been placed and soldered to the cover 14, the wire 21 then extends out through the tube 26 and it is only necessary to apply a small amount of solder to seal wire 21 to the tube 26. This will seal the ceramic insulator 14E with respect to the cover 14.

A charge of desired gas or fluid is introduced into space 10I at any suitable time. Thus with the cover in place and with tube 26 soldered to wire 21, the device is baked out under vacuum and a charge of gas introduced via the open end of tube 30. The tube 30 is then sealed off.

The device is then ready for calibration. For purposes of calibration the device is immersed in a constant temperature bath CT, see FIGURE 10, which can be either melting ice, steam at an established pressure, or other melting materials which have a definite melting point. The entire device is brought to a certain established temperature by the bath CT. In some instances tube 30 will be left open and the charge placed in space 10I during calibration. When this is done, a charge of fluid can then be introduced into space 10I of the device by way of the tube 30E, the end of which was left open up to this point and the tube is then sealed off. Alternatively the charge of fluid can be introduced into the sealed space 10I of the cup 10 and cover 14 prior to soldering the tube 26 to the wire 21. In any event, a charge of fluid such as air or a rare gas is contained within the cup 10 and at a prescribed temperature this charge will establish a certain pressure against the diaphragm 12. This pressure is applied from the interior of the cup 10, thence through the slot 22A and through the apertures 10E and 10F against the diaphragm 12 which is hermetically sealed to cup 10. Then pressure is applied via the tube 18 from an exterior source. When the pressure of the exterior source is adjusted, it will at certain pressure, deflect the diaphragm 12 sufficiently so that the contact-lever 20 is deflected to the right and into contact with the end of the cooperating contact wire 21, thereby establishing a circuit. It will be noted that an electric circuit extends via the wire 21 through the insulator 14 and insulator 24, and this circuit is not completed until the contact wire 21 engages the end 20B of the lever-contact 20. The circuit continues from the body of the pressure standard instrument via the ground wire G, as shown in FIGURE 10. An indicia marking IND as illustrated in FIGURE 10, is then stamped on the exterior of the pressure standard body indicating that pressure at which the signal indication is established at prescribed temperature.

Since the device is entirely sealed, the same circumstances of circuit closure and indication will be established whenever the pressure standard is again maintained at the prescribed temperature and the external pressure is adjusted to the certain amount necessary for deflecting the diaphragm 12 to establish the aforesaid contact. Each calibration device thus provides a pressure check for one pressure. By using a series of such devices, one for each pressure, a gauge scale or other pressure responsive device can be calibrated in a manner analogous to the manner of use of "gauge blocks" for calibrating length measurement devices.

The dimension D1 indicates the limit of deflection of the diaphragm 12 and since this need only be a few thousandths of an inch, for a diaphragm several inches in diameter, the diaphragm is never subjected to excessive stresses. It will be observed that the surface 10S (of the cup 10) and surface 11S (of the disk 11) both serve to support the diaphragm when it reaches these surfaces. Accordingly, the diaphragm 12 is permitted to move only within a certain prescribed space, this space being of plano-convex shape with the convex boundary of the space toward the cup 10 and the planar boundary of the space toward the disk 11. Due to the method of forming the bottom 10B of cup 10, this space on the convex side is almost exactly the shape which diaphragm 12 takes on application of uniform pressure. If the calibration quantity of gas within the space 10I should expand due to the fact that the pressure check point is for a high pressure and no pressure is applied on pipe 18, the only effect of this will be to exert a pressure against the diaphragm 12 to hold it solidly into contact with the disk 11. Similarly, if due to lowering temperatures or increase of external pressure through the pipe 18 when disconnected, the diaphragm should be moved against the surface 10S of the cup; this will cause no harm because the only effect will be slightly to bend the lever-contact 20 after its portion 20B has made contact with the end of the wire 21. Since the entire lever-contact 20 is a fine wire, this flexibility is well within the limits of the instrument. Therefore, the diaphragm 12 is perfectly free to move between its extreme positions as determined by the shape of the plano-convex cavity PC, FIGURE 1.

The diaphragm 12 can be considered as being a substantially flaccid material offering substantially no resistance to movement due to pressure imposed against it in either direction. Offhand, this would not seem to be true of a strong material such as stainless steel, but it has been discovered that such condition does exist. That is thought to be due to the fact that the amount of movement of diaphragm 12 is only a few thousandths of an inch before actuation of the contact 20B against the contact 21. Throughout this range of movement, there is substantially no resistance to movement by the diaphragm. In the drawings, diaphragm 12 is shown as of exaggerated thickness. It can be quite thin, as for example, 0.001 inch in "thickness."

In well made mercury manometer instruments it is almost impossible to obtain an accuracy of $10^{-3}$ p.s.i. In mercury manometer type instruments an accuracy of 2 to $5 \times 10^{-3}$ p.s.i. is more usual.

By utilizing this invention and by careful attention to manufacture it is possible to obtain an accuracy of $10^{-4}$ p.s.i., that is to say, a pressure change of $1 \times 10^{-4}$ p.s.i. is sufficient to cause contacts 20–21 to open (or close).

While it is heretofore indicated that the surface 10S of cup 10 can be shaped by applying pressure thereto to deform it, this is merely the preferred method. The surface 10S can also be shaped by machining.

Also, near the weld W1, one may, if desired, place concentric corrugations on the respective opposed cooperating surfaces of the cup bottom 10S and disk surface 11S which grip the diaphragm. However, this is not essential when suitable metals are used. The preferred metal for cup 10, disk 11, and diaphragm 12 is stainless steel and surfaces 10S and 11S are given a #16 (i.e. RMS 16) or mirror finish and then passivated. The junction of the parts at welds W1 and W2 is then by the Tig welding process. When this is done the bottom 10B can be deflected with pressure without loss of hermetic seal between the cup 10 and diaphragm 12 or between diaphragm 12 and disk 11.

While the preferred material is stainless steel and manufacturing is as above exemplified, it must be understood that other materials and methods can be used while still obtaining the benefits of the invention.

Figure 11:
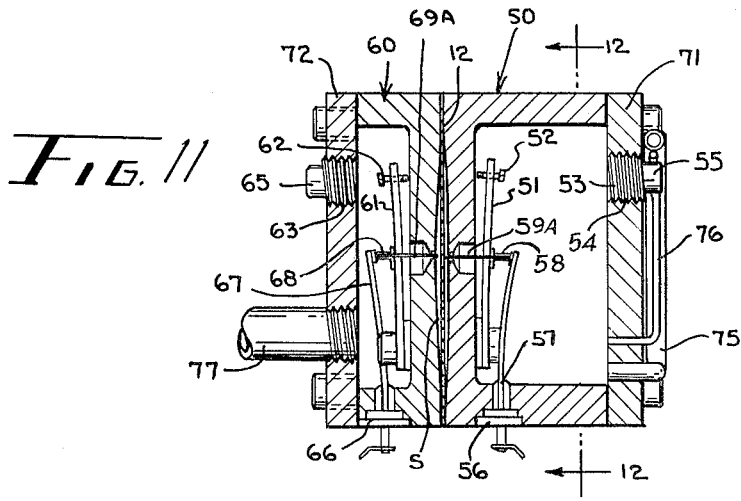
FIGURES 11 and 12 illustrate a slightly modified form of the invention.
Figure 12:
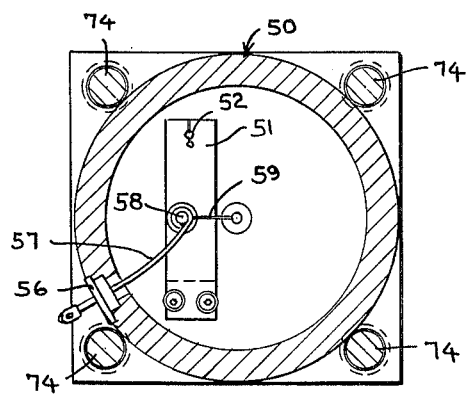

Referring to FIGURES 11 and 12, in these figures there is illustrated a modified form of the invention where there is provided a cup 50 (which is generally the same as the cup 10 of FIGURES 1–9) and a cup 60 (which replaces disk 11 of FIGURES 1–9). Each of these cups 50 and 60 is provided with a spring mounting as at 51 and 61, the position of which may be adjusted by the screws 52 and 62 respectively, which are accessible through the adjustment ports 54 and 63, these adjustment ports being closed by the plugs 55 and 65. Into the sidewall of the cup 50 there is introduced an insulator 56 through which a connection wire 57 extends, this being attached to an insulated stud 58 mounted on the mounting finger 51. From the stud there extends a side wire extension 59 which is bent over at 59A to form an electrical contact which is engagable by the diaphragm 12 when the diaphragm is deflected. Accordingly by turning the screw 52, the position of the contact wire 59A can be changed very slightly for adjustment. When it is adjusted so that the end of the wire can be engaged by the diaphragm 12 when it is moved a prescribed amount, the diaphragm being the contact, or provided with a contact not shown. Similarly on the mounting finger 61 there is an insulating mounting 68 which receives the lead-in wire 67 that extends through the insulator 66 and from the mounting 68 there extends the side wire 69A contact that serves as a contact against which the opposite side of the diaphragm 12 may engage when the diaphragm is suitably deflected.

In this form of the invention, a coverplate 71 is provided for the cup 50 and a similar coverplate 72 is provided for the cup 60. These coverplates are made square as shown in FIGURES 12 and 4 through bolts or studs at 74—74 are provided for pulling the two coverplates down securely so as to seal the coverplates against their respective cups and also to pull the bottoms of the cups into hermetic seal with the peripheral edge of the diaphragm 12. The coverplate 71 is provided with a flexible tube 75 which serves the same purpose as the tube 30 of the device shown in FIGURES 1–9. In this case, however, the tube 75 is external in respect to the coverplate 71. By pinching the tube 75 at any appropriate place to deform the tube and force more of the gaseous fluid into the chamber, it is possible to calibrate the device. In this form of the invention, there is also a secondary calibration tube at 76, the latter being of smaller diameter to take care of minor calibration. The coverplate 72 for the cup 60 is provided with a pressure connection at 77 to which the test pressure is applied.

The bottoms of each of the cups 50 and 60 are machined or otherwise formed so as to provide a very slight concavity, thus providing a space S in which the diaphragm 12 is adapted to be positioned. This space is convex on each side of the diaphragm. In FIGURE 11 the depth of this convexity on each side of the diaphragm is very much exaggerated, since it is only necessary to provide for a few thousandths of an inch of movement of the diaphragm 12 in either direction for establishing contact with either the contact portion 59A or 69A, depending upon the direction of movement of the diaphragm.

The form of invention as shown in FIGURES 11–12 is easily manufactured, it is inexpensive, it may be disassembled and can be used as a calibration device or as a circuit controller which is responsive to minute changes in pressure, above and below a set amount. Yet, wide changes below the set amount are not damaging to the instrument since the diaphragm is supported throughout all but a negligible central area.

FIGURES 13 and 13A show a slightly modified form of apparatus similar to that shown in FIGURE 1, which utilizes changes in electrical capacitance to sense change in position of diaphragm 12. In FIGURE 13 all elements are the same as in FIGURE 1 except that electrical contact screw 22 and contact wire 20 (of FIGURE 1) are replaced by an electrical capacitance screw 80 which cooperates with diaphragm 12 to form a condenser. Screw 80 has the insulated wire 21 run therethrough and wire 21 terminates at a little insulated metal disc 81 on the end of screw 80, the disc forming one of the condenser elements, diaphragm 12 being the other. Disc 81 is, of course, insulated from screw 80. As diaphragm 12 deflects towards the disc 81 the electrical capacitance between diaphragm 12 and disc 81 is changed and this provides the signal by which the diaphragm movement is sensed. Screw 80 is, of course, slotted at 80A on one side to provide a passage from space 10I to the face of diaphragm 12. The assembly of screw 80, plate 81, and wire 21 are shown in detail in FIGURE 13A.

FIGURE 14 shows another slightly modified form of device, comparable with FIGURE 1, wherein the movement of diaphragm 12 is sensed by a photo-electric system. In FIGURE 14, the construction is the same as in FIGURE 1 except that the central boss 10C, contact screw 22, and wire-contact 21, and the lead-in assembly of port 14D, plug 14E, and elements 25 and 26 are removed. In their place, the wire lever-contact 20 (of FIGURE 1) is slightly modified so as to extend the end 20B (of FIGURE 1) through port 10F, into the space 10I, where it forms a support for a small highly reflective mirror 90. Then a window 91 is sealed-into-the sidewall 10A of cup 10. Externally there is provided a focussed light source 92 which provides light beam 93 directed against mirror 90 when the latter is in the position maintained by the undeflected diaphragm 12. In this position the light beam 93 is reflected back along path 93A, through window 91 to photocell 95. Deflection of diaphragm 12 imposes movement upon the wire-lever 20 (which in FIGURE 14 is merely a mechanical support for mirror 90), and as a consequence, mirror 90 is moved, thereby displacing the reflected light beam 93A with consequent signal sensing at PE cell 95. In this way, deflection of diaphragm 12 is sensed photoelectrically.

As many widely apparently different embodiments of this invention may be made without departing from the spirit and scope thereof, it is to be understood that we do not limit ourselves to the specific embodiments herein.

What we claim is:

1. A pressure standard comprising a fluid tight flaccid planar diaphragm, first and second closure members having surfaces positioned so as to face opposite sides of the diaphragm, those surfaces of said closure members which are directed towards the diaphragm being shaped so that in cooperation with each other they will engage opposite faces of a marginal edge of the diaphragm, said first and second closure members being shaped so that a space within said marginal edge is in the form of a shallow enclosure, said enclosure limiting the movement of said diaphragm in directions substantially normal to the general plane of the undeflected diaphragm, said enclosure further forming a pressure buffer in said directions and being effective to prevent permanent distortion of the diaphragm, said enclosure members being hermetically sealed in respect to said diaphragm, means responsive to the deflection of the diaphragm for providing a signal indication of such deflection, said first closure member being shaped so as with said diaphragm to form a sealed space in which a precise calibrated charge of gaseous fluid is contained for providing a precise predetermined pressure against said diaphragm at a standard temperature, the second closure member being formed with a pressure passage for applying pressure therethrough against that face of the diaphragm engaged by said second closure member.

2. The pressure standard of claim 1 further characterized in that the shallow enclosure is of substantially planoconvex shape and has a short axial dimension.

3. The pressure standard of claim 1 further characterized in that said shallow enclosure is of substantially plano-convex shape and has a short axial dimension, the planar side of said space being defined by said second closure member, the diaphragm being normally disposed substantially in contact with said second closure member and offering substantially no resistance to movement across its operating range.

4. The pressure standard of claim 1 further characterized in that the first and second closure members and diaphragm are welded together.

5. The pressure standard of claim 1 further characterized in that the means responsive to the deflection of the diaphragm for providing a signal indication of such deflection is an electrical contact actuated by said diaphragm.

6. A pressure standard comprising a heavy cup having an apertured bottom and walls, a plate overlying and adjacent the bottom of the cup, a thin flaccid hermetically tight diaphragm between the plate and the cup bottom, the cup and plate being fastened together so as to clamp the periphery of the diaphragm between them and so as to form a hermetic seal between each of them and the diaphragm, said cup bottom concave with respect to the plate so as to form a deflection space between the plate and cup bottom to permit a limited deflection of the diaphragm within said space, said plate and concave cup bottom forming substantially complete surfaces against which the diaphragm is supported at its limits of deflection, means actuated by deflection of said diaphragm for providing a signal indicative of such deflection, a cover hermetically attached to the walls of said cup providing a cup-cover assembly so as with the cup and diaphragm to form a sealed space, said plate being provided with an aperture through which a pressure may be applied to that surface of the diaphragm which faces said plate, and a calibrated amount of gaseous fluid within said sealed space providing a precise predetermined pressure at a standard temperature.

7. The pressure standard of claim 6 further characterized in that the cup and plate and diaphragm are welded together around the periphery of the diaphragm.

8. The pressure standard of claim 6 further characterized in that the plate is planar on that one of its sides which faces the diaphragm and the cup bottom is shallowly dished in a direction away from the plate and diaphragm, the amount of such dish in the cup bottom being increased from nothing at the edges thereof to a maximum at the center of the cup bottom.

9. The pressure standard of claim 6 further characterized in that the plate is thicker than the cup bottom.

10. The pressure standard of claim 6 further characterized in that said means actuated by the diaphragm for providing a signal comprises a pair of electrical contacts which are mounted with respect to the cup and diaphragm so that at least one of them is moved by the diaphragm when the latter is deflected.

11. The pressure standard of claim 6 further characterized in that said means actuated by the diaphragm for providing a signal comprises a lever arm mounted on the cup in a position to be engaged by the diaphragm so as to be moved thereby and contact means actuated by the lever.

12. The pressure standard of claim 6 further characterized in that a calibration tube is provided of the exterior of the cup and hermetically connected thereto, said tube being closed at its distal end, said tube being deformable for volume calibration of the sealed space.

13. The pressure standard of claim 12 further characterized in that a recess space is provided on an exterior surface of the cup-cover assembly for receiving said calibration tube.

14. The pressure standard of claim 6 further characterized in that said means actuated by the diaphragm for providing a signal is comprised as a capacitor plate fixedly attached to said cup and spaced adjacent said diaphragm.

15. The combination as specified in claim 14 wherein a filter is inserted in the aperture where pressure is applied to the surface of the diaphragm.

16. A calibration device which will be responsive to indicate a predetermined known pressure so as to be capable for use as a standard when calibrating other pressure responsive and indicating instruments such as gauges, said device including a housing, a flexible planar, flaccid diaphragm dividing said housing to form a first chamber, said first chamber being hermetically sealed and being filled with a precise quantity of gas confined within said chamber thereby loading a first side of said diaphragm to resist deflection by pressure applied to the opposite side of the diaphragm, said quantity of gas being precisely predetermined so that at a particular temperature it will exert a predetermined pressure load against the diaphragm, which pressure has to be reached by pressure applied to the opposite side of the diaphragm before the diaphragm is deflected, said housing being shaped so as to form a support on each side of the diaphragm for contacting substantially the whole area of the diaphragm to hold it against deflection sufficient to cause permanent deformation of said diaphragm and means to give a signal when the diaphragm is deflected.

References Cited by the Examiner

UNITED STATES PATENTS

| | | | |
|---|---|---|---|
| 1,216,733 | 2/1917 | Rowland | 29—421 |
| 1,346,941 | 7/1920 | Crocker | 73—408 |
| 1,431,914 | 10/1922 | Dashner et al. | 340—236 |
| 1,527,649 | 2/1925 | Hoxie | 88—61 XR |
| 1,971,442 | 8/1934 | Dimmick | 88—61 XR |
| 2,004,769 | 6/1935 | Shanklin | 340—242 |
| 2,031,822 | 2/1936 | Dimmick | 88—61 XR |
| 2,058,256 | 10/1936 | Pike | 340—242 |
| 2,106,495 | 1/1938 | Debor | 29—421 |
| 2,149,068 | 2/1939 | Paul et al. | 340—236 |
| 2,320,886 | 6/1943 | Quiroz | 251—57 |
| 2,337,195 | 12/1943 | Hobbs | 200—83.8 |
| 2,447,749 | 8/1948 | Hallett | 174—65.1 XR |
| 2,551,489 | 5/1951 | Eichmann | 92—101 |
| 2,618,290 | 11/1952 | Van Vliet | 73—4 XR |
| 2,870,301 | 1/1953 | Tikanen | 73—410 XR |
| 2,667,786 | 2/1954 | Spaulding | 200—83 XR |
| 2,680,168 | 6/1954 | Murphy | 200—81.9 XR |
| 2,698,766 | 1/1955 | Cox | 92—98 XR |
| 2,757,871 | 8/1956 | Douglas | 340—238 XR |
| 2,787,681 | 4/1957 | Roeser | 200—81 XR |
| 2,792,569 | 5/1957 | Byrkett | 200—83.2 XR |
| 2,798,129 | 7/1957 | Reese et al. | 340—236 XR |
| 2,841,984 | 7/1958 | Green | 73—406 XR |
| 2,907,320 | 10/1959 | DeWeese et al. | 73—398 XR |
| 2,939,928 | 6/1960 | Learn | 200—83 |
| 2,962,566 | 11/1960 | Lisac | 200—81.5 XR |
| 2,965,732 | 12/1960 | Cassell | 200—83 |
| 2,999,385 | 9/1961 | Wolfe | 73—407 XR |
| 3,021,108 | 2/1962 | Noakes | 92—104 XR |
| 3,031,928 | 5/1962 | Kopito | 73—407 XR |
| 3,072,150 | 1/1963 | Hastings et al. | 92—98 |

NEIL C. READ, *Primary Examiner.*

ISAAC LISANN, ROBERT H. ROSE, *Examiners.*